April 17, 1928.
J. J. N. VAN HAMERSVELD
1,666,187
TURRET MECHANISM FOR MACHINE TOOLS
Filed Dec. 4, 1924    5 Sheets-Sheet 1
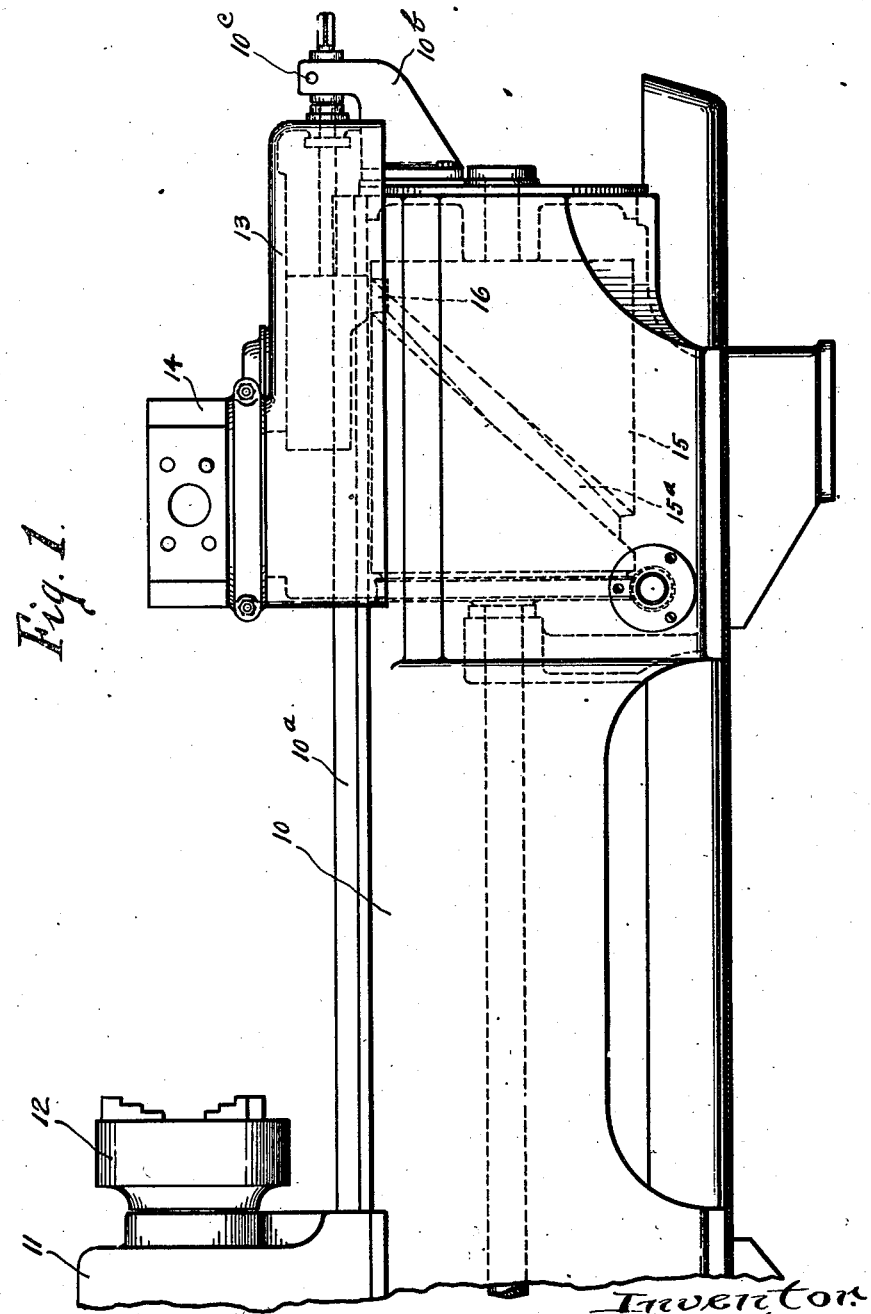

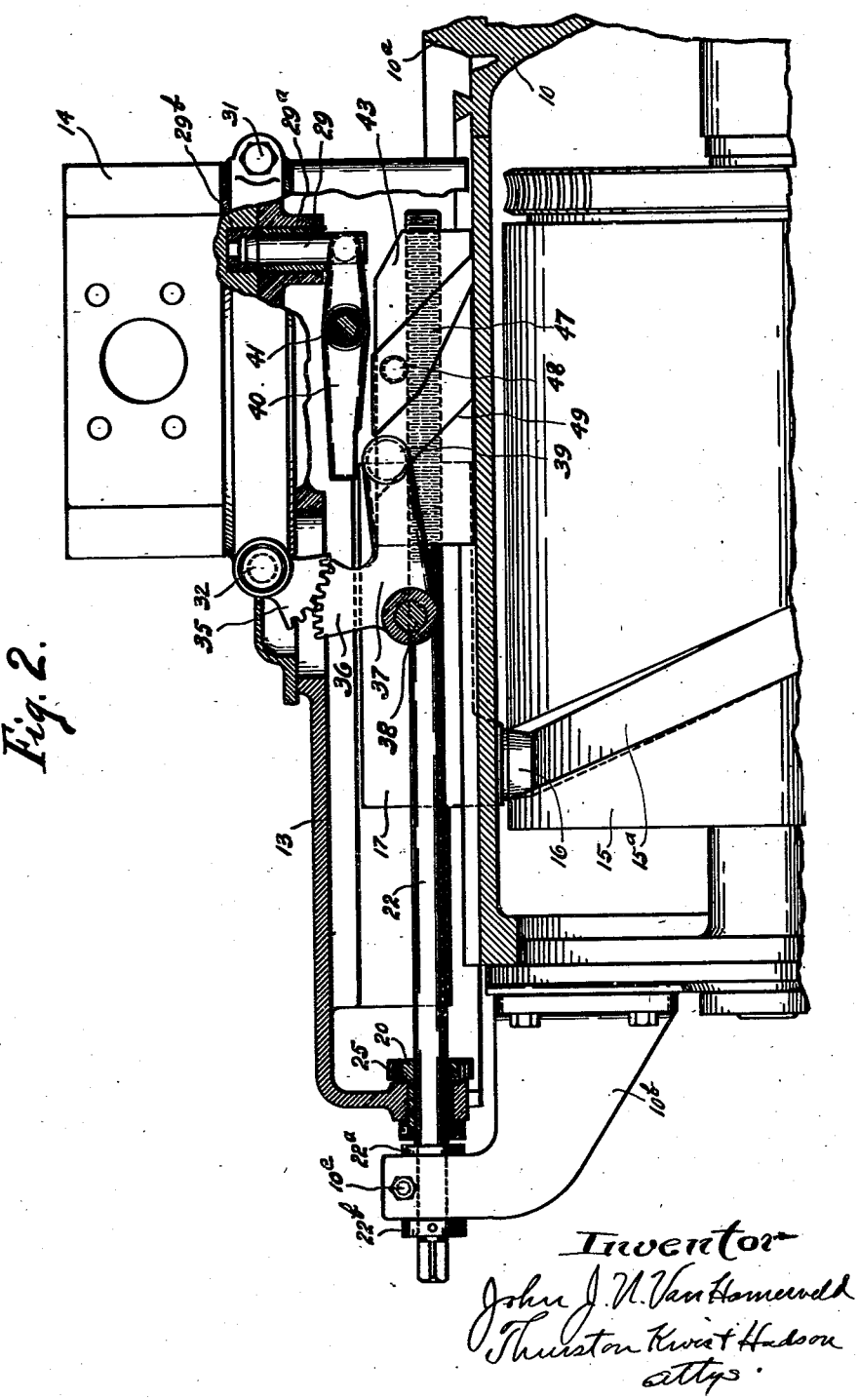

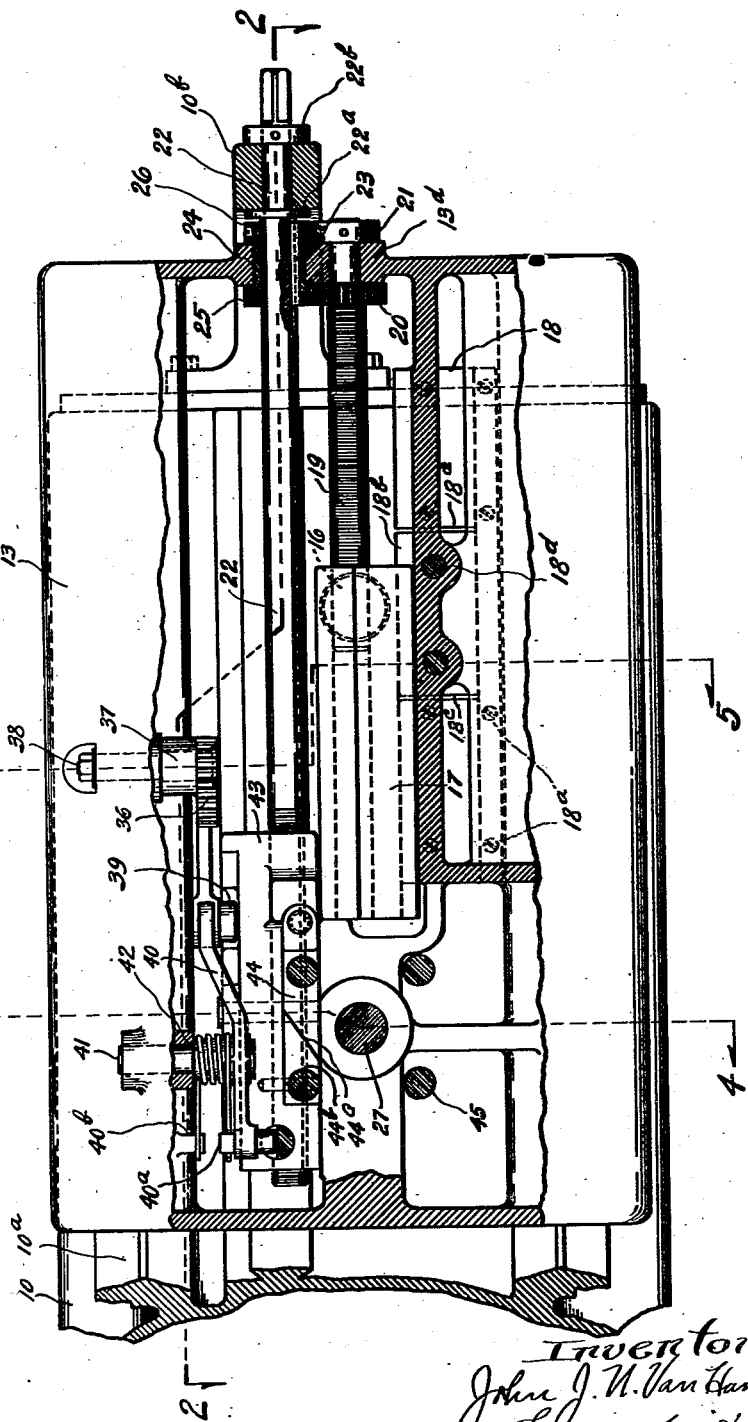

April 17, 1928.

J. J. N. VAN HAMERSVELD 1,666,187

TURRET MECHANISM FOR MACHINE TOOLS

Filed Dec. 4, 1924    5 Sheets-Sheet 4

Inventor
John J. N. Van Hamersveld
Thurston Kwis+Hudson
attys

April 17, 1928. 1,666,187
J. J. N. VAN HAMERSVELD
TURRET MECHANISM FOR MACHINE TOOLS
Filed Dec. 4, 1924 5 Sheets-Sheet 5
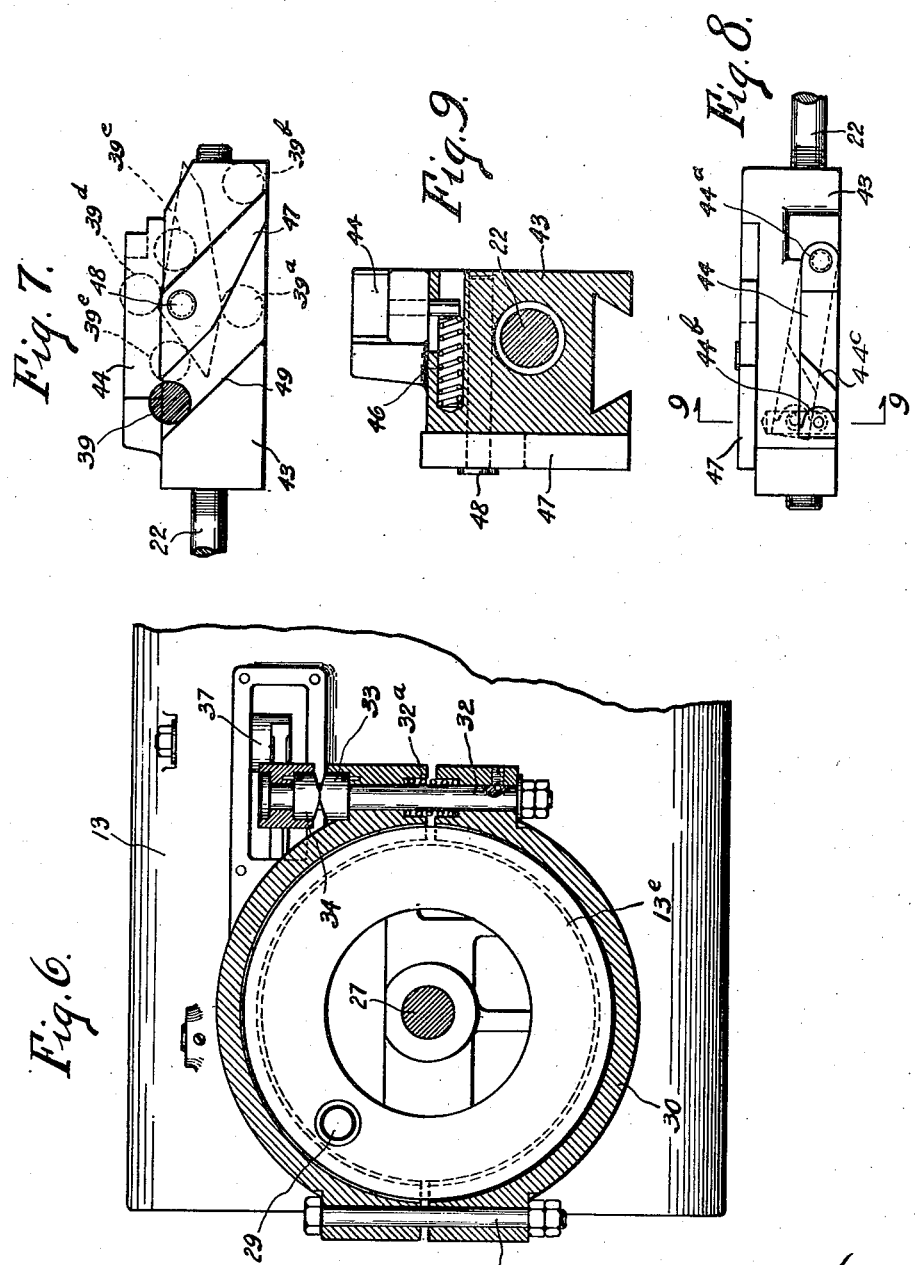

Patented Apr. 17, 1928.

1,666,187

UNITED STATES PATENT OFFICE.

JOHN J. N. VAN HAMERSVELD, OF CLEVELAND, OHIO, ASSIGNOR TO THE WARNER AND SWASEY COMPANY, OF CLEVELAND, OHIO, A CORPORATION OF OHIO.

TURRET MECHANISM FOR MACHINE TOOLS.

Application filed December 4, 1924. Serial No. 753,869.

This invention relates to turret mechanism for machine tools of the type having a rotary tool supporting turret indexed by a step by step movement.

One of the objects of the invention is to provide an improved indexing mechanism. More specifically considered, it is one of the objects to simplify the construction and to provide positive means for actuating the turret clamping means, the lock bolt and the turret indexing mechanism.

A further object is to provide improvements in, or in connection with the adjustment of the turret slide along the bed to accommodate work of different lengths. It is the aim of the invention in this direction to automatically maintain a fixed relation between the turret slide and the indexing mechanism including the devices for actuating the clamping and unclamping means and lock bolt when the turret slide is adjusted along the bed.

The above and other objects are attained by the present invention which may be here briefly summarized as consisting in certain novel details of construction, and combinations and arrangements of parts which will be described in the specification and set forth in the appended claims.

Figure 5:
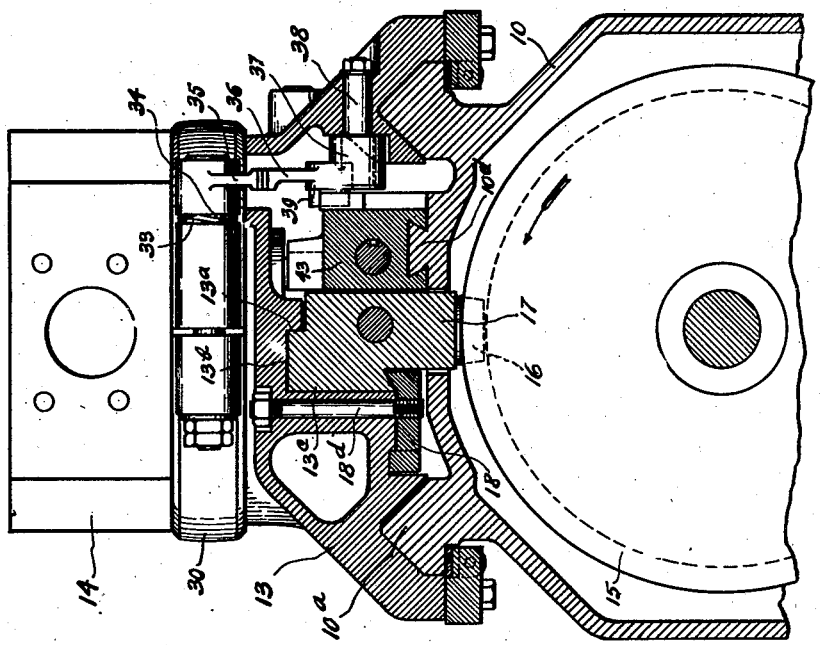
Figure 4:
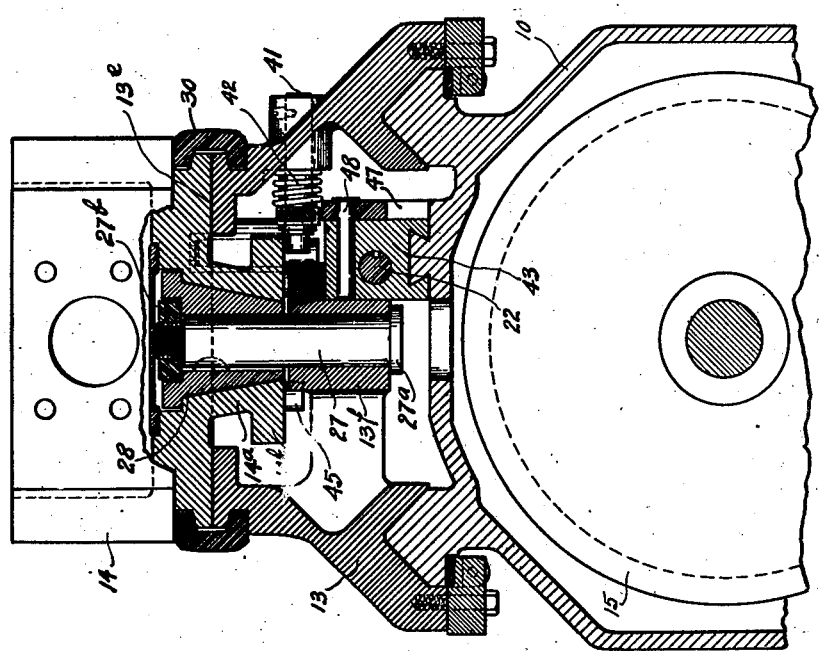

In the accompanying sheets of drawings wherein I have illustrated the preferred embodiment of the invention, Fig. 1 is a side elevation of the major portion of a turret lathe in which the invention is embodied; Fig. 2 is a longitudinal sectional view with parts in elevation, the section being taken substantially along the line 2—2 of Fig. 3, and the parts being shown on an enlarged scale with respect to the scale of Fig. 1; Fig. 3 is a plan view of the turret mechanism with the upper portion removed; Fig. 4 is a transverse sectional view substantially along the line 4—4 of Fig. 3, looking in the direction indicated by the arrows; Fig. 5 is a similar transverse vertical sectional view substantially along the line 5—5 of Fig. 3; Fig. 6 is a plan view of a portion of the turret slide with the turret removed; Fig. 7 is a side view of a cam block carrying a tumbler cam utilized in operating the turret clamping and lock bolt actuating devices; Fig. 8 is a top plan view of the cam block shown in Fig. 7; and Fig. 9 is an enlarged sectional view substantially along the line 9—9 of Fig. 8.

The mechanism of the lathe aside from the turret mechanism may be of any suitable construction, and may be operated by any suitable or convenient means, but in the drawing I have illustrated my invention applied to a lathe of the single spindle chucking machine type, such as constitutes the subject matter of my prior application, Serial No. 731,409, filed August 11, 1924. The parts of the lathe which do not directly pertain to the turret mechanism will be only briefly referred to. These parts include the bed 10, at one end of which is a head 11 including a work spindle for rotating the work holding device, here illustrated as a chuck 12.

Slidable on ways $10^a$ of the bed is a turret slide 13, at the top of which is a rotatable turret 14 adapted to be provided with working tools in the well-known manner. The turret slide is adapted to be moved back and forth over the ways of the bed by a cam drum 15, suitably journaled in the bed and provided with an endless cam groove $15^a$ which is engaged by a roller 16 on the lower face of a ram 17 which is normally fixed to and secured to the turret slide, but capable of adjustment relative thereto. However, the turret slide itself is adjusted relative to the ram, as will be explained presently, as the ram has a fixed or definite stroke forwardly and rearwardly. By reference particularly to Fig. 5, it will be noted that the ram 17 engages faces on the under side of the turret slide, these faces being designated $13^a$, $13^b$ and $13^c$. It will be noted additionally, that the ram is normally held in fixed position with respect to these faces by a bottom clamp-plate 18 which is secured in fixed position on the under side of the turret slide by a series of screws $18^a$. The bottom clamp-plate 18 has a middle section $18^b$ which is utilized to clamp the ram against the faces $13^a$, $13^b$ and $13^c$, the clamping portion being formed by a pair of slots $18^c$ extending from the inner edge inwardly toward, but not entirely to the outer edge of the bottom clamp-plate, and clearly shown in Fig. 3. By means of clamping bolts $18^d$ (see particularly Figs. 3 and 5) the middle section $18^b$ of the clamping plate can be tightly drawn up against an under-cut shoulder of the ram 17 so as to secure the latter in fixed position to the turret slide. On the other hand when the turret slide is to be adjusted relative to the ram, the bolts $18^d$ are loosened, allowing the clamping portion 18$^b$ to spring back sufficiently to permit free sliding movement of the turret slide relative to the ram.

It might be here stated that the turret slide is adjusted relative to the ram to accommodate different lengths of work which may be supported in the chuck 12, the adjustment doing away with the necessity of long overhanging tools when the latter are used with short work pieces. The turret slide is adjusted relative to the ram 17 by a screw 19 which has a threaded portion engaging the ram, this screw extending axially of the machine, and at its rear end being held from endwise movement relative to the turret slide by means of a gear 20 which is fixed to the screw and a collar 21 also fixed to the screw, the gear and collar being on opposite sides of a boss 13$^d$ at the central rear part of the turret slide, this being clearly shown in Fig. 3. The screw 19 is turned by a shaft 22 which is supported in a bracket 10$^b$ of the bed and held from endwise movement relative thereto by shoulders 22$^a$ and 22$^b$ engaging opposite faces of the bracket, as best shown in Fig. 3. The shoulder 22$^a$ is formed by a washer which is fixed to the shaft and engages a shoulder of the shaft close to the bracket 10$^b$, while the shoulder 22$^b$ is formed by a collar similar to the collar 21. The shaft 22 is provided with a long key-way cut into it, which is engaged by a key 23 carried by a sleeve 24, provided at its inner end with a gear 25 engaging the gear 20 on screw 19. The sleeve 24 extends through the boss 13$^d$ of the turret slide, and its outer end is provided with a shoulder in the form of a collar 26. The gear 25 and shoulder 26 hold the sleeve 24 against endwise movement relative to the turret slide, though the sleeve is capable of sliding along the shaft 22 with the turret slide, though of course it rotates with the shaft.

Thus it will be seen that when the clamping bolts 18$^d$ are loosened and when the shaft 22 is rotated, the fact that the shaft 22 is held from endwise movement in the bracket 10$^b$, and the fact that the sleeve 24 and screw 19 are capable of moving with the turret slide, and the further fact that the ram 17 is held from movement by the roller 16 engaging in a cam groove of the drum, the rotation of shaft 22 will cause the turret slide to move forwardly and rearwardly along the bed relative to the ram 17, the direction of movement depending, of course, upon the direction of rotation of shaft 22. After the turret slide has been adjusted to the desired position with reference to the ram 17, the clamping bolts 18$^d$ are tightened, causing the ram and turret slide to be secured in relatively fixed position. The upper rear end of bracket 10$^b$ through which shaft 22 extends, is preferably in the form of a split clamp which accommodates a clamping bolt indicated at 10$^c$. This clamping bolt will be loosened when the operator desires to adjust the position of the turret slide relative to the ram 17, and it will be tightened after the adjustment is made.

A further function of shaft 22 will be explained subsequently, after describing more of the operating mechanism.

By reference to Fig. 4 it will be seen that the lower face of turret 14 rests upon a flat upper face 13$^e$ of the turret slide, this face being circular, as indicated in Fig. 6. The turret is centered and rotatably held to the turret slide by a center-bolt 27 having at its lower end a head 27$^a$ engaging against the lower face of a boss 13$^f$ of the turret slide. The turret 14 has a sleeve like portion 14$^a$ extending down into an annular recess within the flat face 13$^e$ of the turret slide, and at the bottom of this sleeve like portion is a flange 14$^b$. The sleeve like portion 14$^a$ has a tapered opening therein which receives a tapered bearing bushing 28 which is held against rotation by a key engaging the center-bolt 27, or otherwise, and is positioned by a clamping nut 27$^b$ at the upper end of the center-bolt 27 so that by this means the turret is accurately and properly centered on the turret slide. It might be here noted that the centering device for the turret 14 is independent of the turret clamping means, and therefore need not be disturbed when the turret is clamped to or unclamped from the slide.

The turret is adapted to be held against rotation by a lock-bolt 29 (see Fig. 2) which is supported in the upper flange of the turret slide in a bushing 29$^a$, and has a tapered upper end adapted to engage in any one of a series of openings each formed in tapered bushing 29$^b$ secured in the lower side of the turret. Additionally the turret is adapted to be clamped to the turret slide by a two-part clamping ring 30, having beveled surfaces adapted to engage correspondingly beveled surfaces at the adjacent faces of the turret slide and turret, as clearly shown in Fig. 4. The two parts of this clamping ring are held together by a bolt 31 on one side of the turret, and they are adapted to be actuated to clamp or release the turret by a bolt 32 which is suitably held from rotation in one clamping ring; and carries a cam member 33 which is held from rotation in the other clamping ring and which is adapted to be engaged by a similar cam member 34 rotatably mounted on the bolt 32 (see Fig. 6). The cam member 34 carries a gear segment 35 which engages a similar gear segment 36 of a bell-crank lever 37 mounted on a bearing pin 38 carried by the turret slide, as shown at the right hand side of Fig. 5. One arm of this bell-crank lever 37 carries a roller 39, this roller being shown by dotted lines in Fig. 2, and by full lines in Fig. 3. The manner in which this bell-crank 37 is rocked to actuate the turret clamp will be referred to presently. It might be stated that both bolts 31 and 32 are adatped to be taken up to compensate for wear. A spring 32ª surrounding bolt 32 and seated in sockets formed in the adjacent faces of the two parts of the clamping ring insures the opening of the clamping-ring to release the turret.

Referring again to the lock-bolt 29 it will be observed that this lock-bolt is moved vertically to lock or release the turret by a lock-bolt lever 40 pivotally supported on a pin 41 of the turret slide. One end of this lock-bolt lever 40 engages in the side of the lower end of the lock-bolt 29; the opposite end projects rearwardly or overlies the forward end of bell-crank 37, as shown in Figs. 2 and 3. The normal position of the lock-bolt lever 40 is as shown in Fig. 2 with the lock-bolt in turret locking position, the lever and lock-bolt being held in the position stated by a spring preferably in the form of a rat trap spring 42 which surrounds the sleeve like extension of the lock-bolt lever 40 and has one end engaging the end of a lug 40ª of the lock-bolt lever 40 and at its other end engaging over a lug 40ᵇ of the turret slide, as clearly shown in Fig. 3. It might be here stated that by extending one end of the lock-bolt lever 40 over one end of the bell-crank 37 the movement of the latter which released the turret clamp will also rock the lock-bolt lever so as to withdraw the lock-bolt from the turret.

The devices for actuating the bell-crank 37 and for indexing the turret are carried by a block 43 which is normally stationary on the bed but is capable of adjustment as hereinafter described along the dove tail or undercut way 10ᵈ clearly shown in Figs. 4 and 5. For the purpose of indexing the turret this block is provided on its upper side with a pawl 44 pivoted at 44ª on the block and provided at its forward end with a substantially semi-circular notch 44ᵇ which is adapted to be engaged by indexing pins 45 on the lower flange 15ᵇ of the turret (see Figs. 3–4 and 8). During each backward or return movement of the turret slide one of the indexing pins engages in the notch of the pawl 44 causing one of the step by step or indexing movements to be imparted to the turret. When this occurs, the pawl being held stationary as far as movement along the bed is concerned, it swings laterally to accommodate the arc shaped movement of the indexing pin. The pawl 44 normally lies parallel with the axis of the machine as shown by full lines in Fig. 8 and is normally held in that position by a spring 46 which lies in a socket of the block 43 and engages a pin extending downwardly from the pawl through a slot in the top portion of the block 43. At the completion of the indexing movement the pawl 44 occupies a position with respect to the indexing pins as shown in Fig. 3. The next succeeding pin to that which the pawl engaged to give the turret the indexing movement extends over a portion of the pawl as shown in this figure. In consequence during the next forward movement of the turret slide this next succeeding pin engages a tapered face 44ᶜ of the pawl, swinging the pawl laterally outwardly to a position indicated by dotted lines in Fig. 8, so that this pin may move forward beyond the pawl which immediately snaps back to its normal position under the action of spring 46. This succeeding pin referred to will then be in position with respect to the pawl to be engaged by the latter on the next return movement of the turret slide causing another indexing movement to be imparted to the turret.

Additionally the block 43 is provided on its outer side with a tumbler cam 47 which is pivoted to the side of the block by a pin 48 (see Figs. 4 and 7). As the fulcrum of the pivoted pin is not in the center of this tumbler cam the latter normally occupies the position shown in Fig. 2 and as shown by full lines in Fig. 7 with the lower end of the cam resting upon a portion of the bed as shown in Figs. 2 and 5. On the same side of the block a short distance rearwardly of the tumbler cam there is an inclined shoulder or cam surface 49. This tumbler cam 47 cooperates with the roller 39 of the bell-crank 37 in the following manner, reference being had particularly to Fig. 7. In this figure the roller 39 of the bell-crank is shown by full lines and in section in one position and by dotted lines in several other positions, the full line position corresponding to the extreme rearward position of the turret slide with the parts as illustrated in Fig. 2. The roller is now resting on the shoulder 49 of block 43 and is just rearwardly of the rear point of tumbler cam 47 and slightly below this point of the cam. At this time and with the roller 39 in this position the indexing movement has been completed, the lock-bolt is released, the turret is unclamped and the turret slide is about to move forwardly. As the slide moves forwardly the roller 39, of course, moves forwardly with it and it hooks under the rear face of tumbler cam 47 and is caused thereby to have a downward as well as a forward movement. During this movement the bell-crank 37 is rocked to clamp the turret. When the roller reaches the position indicated at 39ª the turret is fully clamped. Further forward movement of the turret slide causes the roller 39 to pass under and then beyond the tumbler cam 47, which is swung upward by the roller as it passes underneath it and then again drops back by gravity to the full line position of Fig. 7.

After the slide has completed its forward movement and the tools have completed their cutting function, and the turret is to be indexed, the slide will move backward and near the end of its backward movement the roller 39 will engage the lower forward end of the tumbler cam when it reaches the position of 39^b, and as the rearward movement of the turret slide continues, the roller rides up the inclined forward face of the cam; when it reaches the position indicated at 39^c the turret is unclamped. As it moves from this position to substantially the position 39^d the end of bell-crank 37 engages and rocks lock-bolt lever 40 causing the lock-bolt to be withdrawn. As the pressure of the rat trap spring 42 is through the lock-bolt lever 40 and is now exerted on the end of bell-crank 37 the roller rides down the upper rear surface of the tumbler cam and when the roller reaches substantially the position shown at 39^e the lock-bolt is released so that the upper tapered end thereof engages against the bottom of the turret in a manner such that when the indexing motion is completed it will snap into the next tapered opening in the turret. When the roller moves from posion 39^d to 39^e the tumbler cam 47 is rocked under the pressure of rat trap spring 42 exerted on the bell-crank lever through lock-bolt lever 40, the tumbler cam thus being rocked to the dotted line position shown in Fig. 7. When the roller reaches the position 39^e, releasing the lock-bolt, as stated above, the further rearward movement of the turret slide causes the roller to move from the position 39^e to the full line position 39, i. e. past the upper rear end of tumbler cam, the latter then swinging by gravity to the full line position. It might be here stated that while the roller is traveling from position 39^d to position 39 during the rearward motion of the turret slide the turret is indexed, and when the roller reaches the position 39 the turret having completed its indexing at this point, the lock-bolt snaps back to locking position.

I have previously explained that the turret slide can be adjusted along the bed relative to the ram carrying the roller which engages in the groove of the actuating cam drum 14, and I have described the mechanism by which this adjustment of the slide is accomplished. When the turret slide is thus adjusted the turret indexing pins and the turret clamping bell-crank 37 with its roller 39 move with the turret slide forwardly or rearwardly. This necessitates a forward or rearward adjustment of the block carrying the devices which actuate the turret lock-bolt, the turret clamp and cause the indexing movements to be given to the turret. Without this adjustment of the block carrying these devices the operative relationship of the parts is lost or destroyed.

In accordance with an important part of my invention the block 43 and the turret slide are maintained in fixed relation; that is to say, when the turret slide is adjusted the block 43 is similarly adjusted. This is accomplished by the use of the shaft 22 which is geared to the screw 18, the operation and effect of which have already been described. To bring about this fixed relationship between the turret slide and block 43 the forward end of shaft 22 is threaded and engages in a threaded opening extending in an endwise direction through block 43. The ratio of the gears 20 and 25 is so selected with respect to the ratio of the two screw threads on shaft 22 pitches and screw 19 that when the shaft 22 is turned the turret slide and block 43 will have exactly the same movement forward or rearward.

It will be seen, therefore, that by providing a single or unitary mechanism which is operated from one point and which simultaneously adjusts the position of the turret slide and the position of the normally fixed block 43, giving both parts an identical movement, the adjustment of the turret slide and the adjustment of the normally stationary block 43 is accomplished in a most simple manner and without the necessity of separately adjusting the block 43, which would otherwise be necessary, and without liability of the block 43 being improperly positioned which might cause damage or breakage or prevent complete indexing of the turret. It should be noted that though I have provided means for simultaneously adjusting the turret slide and the fixed block 43, the arrangement and construction are such that the adjusting mechanism in nowise interferes with or prevents the normal reciprocating or sliding movement of the turret slide, since sleeve 24 is slidable along shaft 22. It is to be remembered that regardless of the adjustment of the slide on the bed, the slide is given a forward and rearward sliding movement of a given length which is determined by the length of the cam groove 15^a of cam drum 15.

In conclusion it should be noted that when the ram 17 is clamped in the slide and when the shaft 22 is clamped in the bracket 10^b it is not at all possible for the adjustment of the slide and of the block 43 to be disturbed by vibration due to the operation of the machine or otherwise.

While I have shown the preferred construction I do not desire to be confined to the exact details shown but aim in my claims to cover all modifications which do not involve a departure from the spirit and scope of my invention as set forth in the appended claims.

Having described my invention, I claim:
1. In a machine tool of the turret type, a bed, a turret slide movable along the bed, a turret carried by the slide, a member supported by the bed independently of the slide and having a device for causing the indexing of the turret during the movement of the slide, and adjusting means connected to the slide and to said member for simultaneously adjusting both.

2. In a machine tool of the turret type, a bed, a turret slide, mechanism for moving the slide back and forth along the bed, a turret on the slide, means for locking the turret to the slide, an actuating device therefor, a device for indexing the turret while the slide is being given its normal movement, said devices being supported by the bed independently of the slide, and means for adjusting the turret slide along the bed and at the same time maintaining a fixed relation between the turret slide and said devices.

3. In a machine tool of the turret type, a bed having a turret slide, means for moving the slide forwardly and rearwardly along the bed, a turret carried by the slide, a member supported on the bed independently of the slide and having a device for indexing the turret during a portion of the movement of the slide in one direction, and means connected to the slide and to said member for adjusting the slide along the bed and at the same time maintaining a definite relation between the position of the slide and said member.

4. In a machine tool of the turret type, a bed, a turret slide on the bed adapted to be moved forwardly and rearwardly along the same, a turret on the slide, means for locking the turret to the slide, a member supported on the bed independently of the slide and having devices for actuating the locking means and for indexing the turret during portions of the movement of the slide, and means connected to the slide and to said member for adjusting the slide along the bed and at the same time maintaining a definite relation between the slide and said member.

5. In a lathe of the turret type, a bed, a turret slide movable forwardly and rearwardly along the bed, a turret on the slide, a clamp for clamping the turret to the slide, devices for actuating the clamp and for indexing the turret when released by the clamp during portions of the movement of the slide, and means for adjusting the slide along the bed and at the same time maintaining a definite relation between the slide and said devices.

6. In a machine tool of the turret type, a bed, a slide movable forwardly and rearwardly along the bed, a turret on said slide, a lock-bolt for the turret, a clamp for clamping the turret to the slide, devices for indexing the turret, for actuating the lock-bolt and for actuating the clamp during portions of the movement of the slide along the bed, and means for adjusting the position of the slide and at the same time adjusting the positions of said devices.

7. In a machine tool of the turret type, a bed, a turret slide movable forwardly and rearwardly along the bed, a lock-bolt for the turret, a clamp for clamping the turret to the slide, devices for actuating the lock-bolt, for actuating the clamp and for indexing the turret during portions of the movement of the slide along the bed, a normally stationary member supporting said devices, means for adjusting the slide along the bed and for simultaneously imparting a similar adjustment to said member, and means for centering the turret on the slide, said means being independent of the turret clamping means.

8. In a machine tool of the turret type, a bed, a turret slide movable forwardly and rearwardly along the bed, a turret on said slide and adapted to be indexed, means for securing the turret to the slide against rotary movement thereon, a normally stationary member supported on the bed having devices for actuating said securing means and for indexing the turret during portions of the movement of the slide, a pair of members adapted to be actuated to adjust the position of the slide along the bed and to adjust said normally stationary member, and means coupling said members together so that simultaneously similar adjustments will be given to the slide and to said stationary member.

9. In a machine tool of the turret type, a bed, a turret slide movable along the bed and provided with a turret, a ram normally connected with the turret slide, means for reciprocating the ram to move the turret slide back and forth along the bed, a member supported by the bed independently of the slide and having a device for causing the indexing of the turret during the movement of the slide, and means for simultaneously adjusting said slide relative to the ram and said member relative to the bed.

10. In a machine tool of the turret type, a bed, a turret slide movable back and forth along the bed and provided with a turret, a ram normally connected with the turret slide for reciprocating the same, means for locking the turret to the slide, devices for actuating the locking means, and for indexing the turret while the slide is being given its normal movement, and means for adjusting the slide relative to the ram and at the same time maintaining a fixed relation between the slide and said devices.

11. In a machine tool of the turret type, a bed having a turret slide provided with a turret, a ram normally connected to the slide and movable back and forth along the bed, means for locking the turret to the slide, a normally stationary member supported on the bed and provided with devices for actuating the locking means and for indexing the turret, and means for adjusting the slide relative to the ram and at the same time maintaining a definite relation between the position of the slide and said member.

12. In a machine tool of the turret type, a bed, a turret slide movable along the bed, a lock-bolt for locking the turret to the slide, a clamp for clamping the turret to the slide, and a normally stationary member having means for causing during the movement of the slide along the bed the actuation of both the lock-bolt and the clamp.

13. In a machine tool of the turret type, a bed, a turret slide movable along the bed, a lock-bolt for locking the turret to the slide, a clamp for clamping the turret to the slide, and a normally stationary cam for causing during the movement of the slide along the bed the actuation of both the lock-bolt and the clamp.

14. In a machine tool of the turret type, a bed, a turret slide movable forwardly and rearwardly along the bed, a turret on the slide, a lock-bolt and a clamp for respectively locking and clamping the turret to the slide, a pair of members carried by the slide for actuating the lock-bolt and clamp, and means for actuating one of said members whereby it causes the actuation of the other member during the movement of the slide along the bed.

15. In a machine tool of the turret type, a bed, a turret slide movable forwardly and rearwardly along the bed, a turret on the slide, a lock-bolt and a clamp for respectively locking and clamping the turret to the slide, a lever for actuating the clamp, a cam member for rocking said lever, and a second lever for actuating the lock-bolt and adapted to be actuated by the first mentioned lever during the movement of the slide along the bed, and a normally stationary member having means for actuating said first-mentioned lever.

16. In a machine tool of the turret type, a bed, a turret slide movable forwardly and rearwardly along the bed and provided with a turret, and a ram normally connected with the slide and adapted to be reciprocated to give the slide its normal movements, said slide having a member which normally forms a guideway by which the ram and slide may be relatively adjusted, said member having a portion by which the ram and slide may be clamped to hold them against relative movement.

17. In a machine tool of the turret type, a bed having a turret slide movable back and forth along the same and provided with a turret, a ram normally connected with the slide and adapted to be reciprocated to give the ram its normal movements, a clamp plate carried by the slide and adapted to serve as a guideway for the ram when the slide and ram are relatively adjusted, and said clamp plate having a flexible portion adapted to be firmly clamped against the ram to hold the latter and the slide against relative movement.

In testimony whereof, I hereunto affix my signature.

JOHN J. N. VAN HAMERSVELD.